July 13, 1965  C. B. TURTON  3,194,907
INTERLOCK MECHANISM FOR AN ENCLOSED ELECTRIC SWITCH
Filed June 28, 1963  3 Sheets-Sheet 1
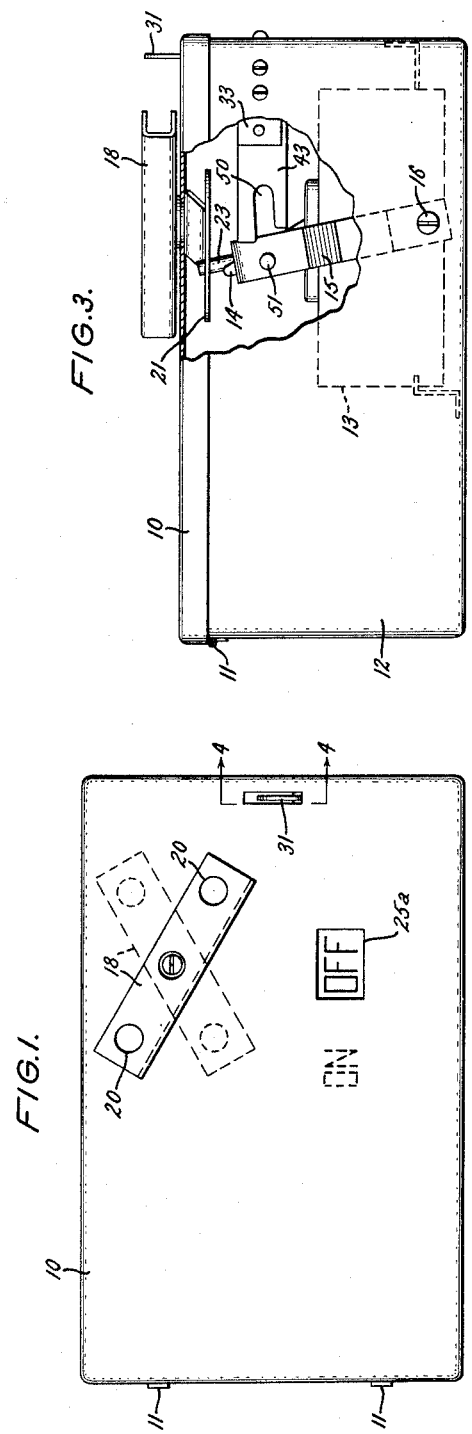
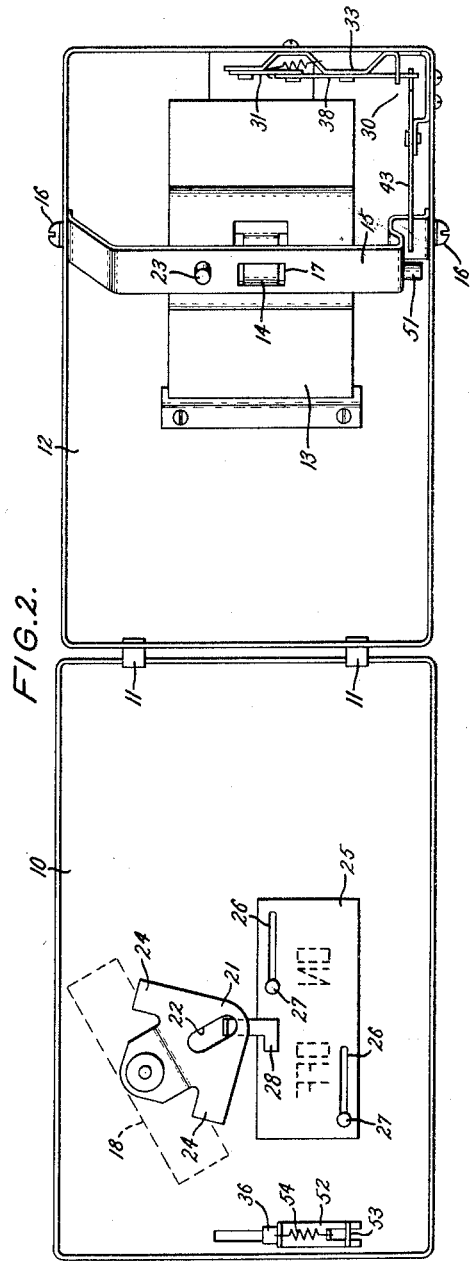
INVENTOR:
CECIL B. TURTON,
BY
ATTORNEY.

July 13, 1965   C. B. TURTON   3,194,907
INTERLOCK MECHANISM FOR AN ENCLOSED ELECTRIC SWITCH
Filed June 28, 1963   3 Sheets-Sheet 2
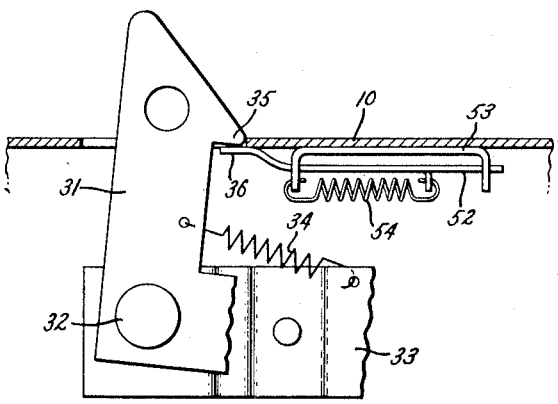
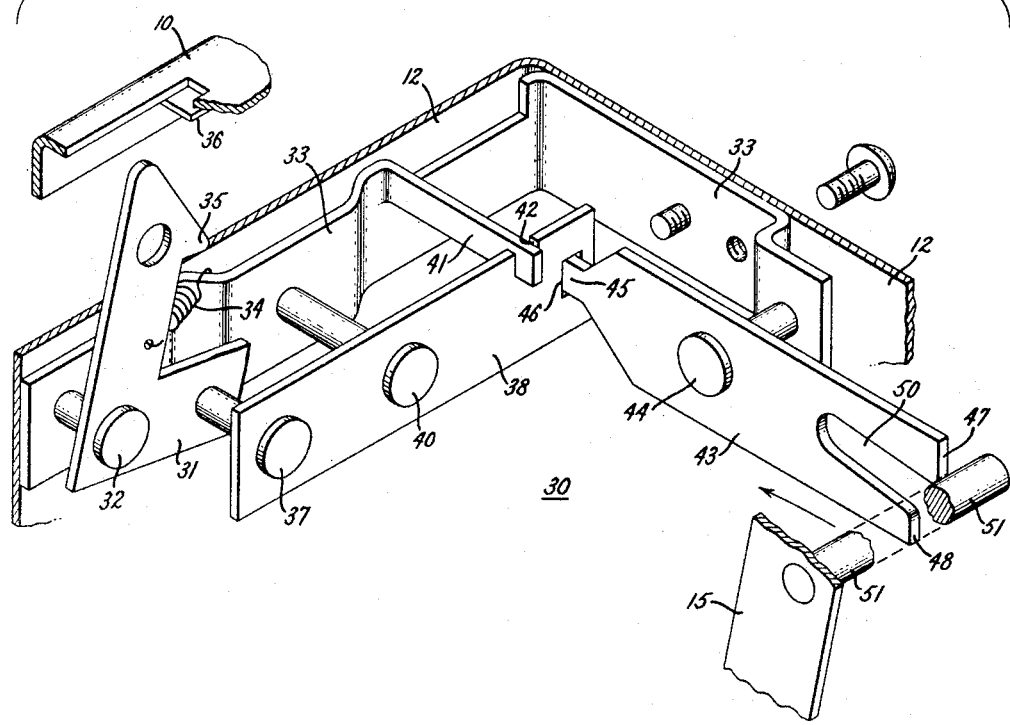
INVENTOR:
CECIL B. TURTON,
BY J. Wesley Nauburn
ATTORNEY.

July 13, 1965  C. B. TURTON  3,194,907
INTERLOCK MECHANISM FOR AN ENCLOSED ELECTRIC SWITCH
Filed June 28, 1963  3 Sheets-Sheet 3
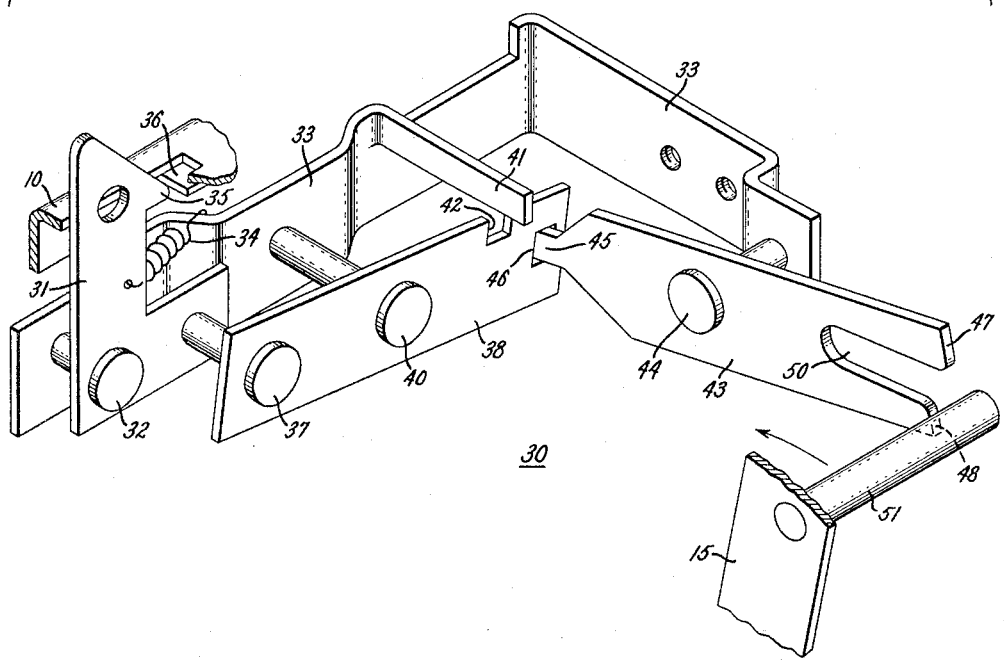
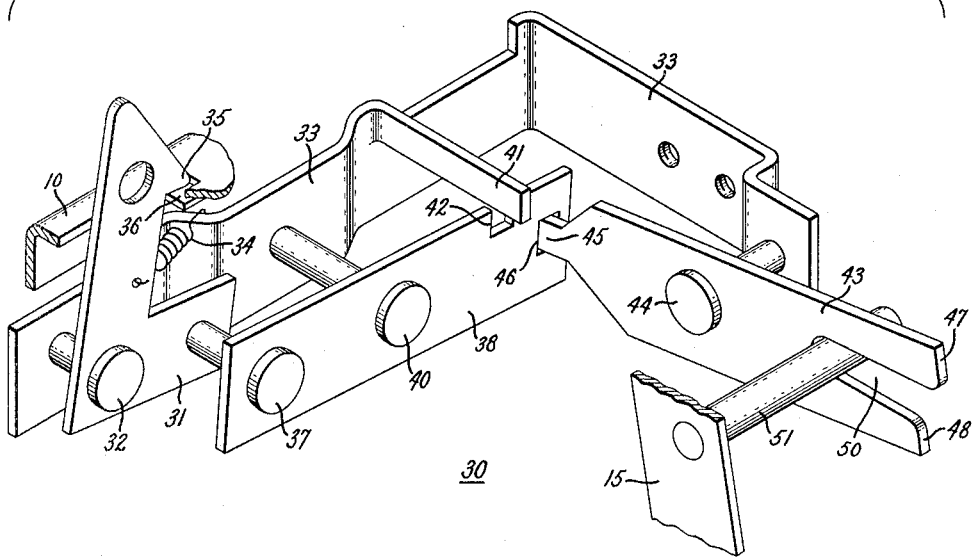
INVENTOR:
CECIL B. TURTON,
BY J. Wesley Hauber
ATTORNEY.

3,194,907
INTERLOCK MECHANISM FOR AN ENCLOSED ELECTRIC SWITCH
Cecil B. Turton, Burlington, Conn., assignor to General Electric Company, a corporation of New York
Filed June 28, 1963, Ser. No. 291,317
3 Claims. (Cl. 200—50)

This invention relates to an interlock mechanism for enclosed electric switches, and more particularly it relates to a mechanism for interlocking an access cover of a housing which encloses an electric switch, circuit breaker, or the like.

Industrial electrical distribution equipment typically makes use of circuit breakers or a combination of switch and fuses or other similar electric circuit controlling devices intended to serve as a means of cutoff of power from a supply source. Such devices are ordinarily located in a grounded sheet metal enclosure having an openable cover or door provided for convenient access to the interior of the enclosure for the purpose of replacing fuses or carrying out routine maintenance procedures. For safety reasons it is desirable to interlock the access cover with the enclosed switching device in a manner assuring that the cover cannot be opened unless the device is in an open-circuit condition.

Accordingly, a general object of this invention is the provision, for an electric circuit controlling device mounted in an enclosure having an openable access cover, of an improved interlock mechanism which, when the enclosed switching device is in an open circuit condition, permits the cover of the enclosure to be opened, but which prevents the cover from being opened when the switching device is in a closed circuit condition and exposed terminals within the enclosure are therefore energized. The invention contemplates a simplification of the ordinarily cumbersome and elaborate mechanisms which have been employed for these purposes heretofore.

In carrying out the invention in one form, an interlock mechanism is provided for an electric circuit controlling device located within an enclosure having an openable access cover normally disposed and latched in a closed position. The interlock mechanism comprises a spring-loaded cover catch, two levers pivotally mounted on adjacent walls of the enclosure, and a switch operating member engaging the handle of the enclosed switching device. In moving from circuit-open to circuit-closed position a portion of the switch operating member enters and moves freely along a slot in a bifurcated end of one of the aforesaid levers remote from the cover catch when the cover is closed and latched. When the cover is open, however, the cover catch is rotated to a different position and this in turn rotates the two levers to positions in which the bifurcated lever slot is out of alignment with the previously mentioned portion of the operating member, thereby preventing the closing of the circuit breaker. One of the two projections defining the bifurcation interferes with switch closing movements of the switch operating member when the cover is open; the other of the two projections defining the bifurcation prevents switch closing movements of the operating member when the cover is almost closed but not yet latched. Although inadvertent and dangerous closing of the switch contact cannot be carried out when the cover is open, the cover cannot carelessly be opened when the switch contacts are closed, means are provided for intentional defeat of interlock functions by trained personnel for servicing and inspection purposes.

The invention will be better understood and its various objects and advantages will be more fully appreciated from the following description taken in connection with the accompanying drawings in which:

FIGURE 1 is a top view of an enclosed electric circuit controlling device of the type to which this invention pertains, the access cover of the enclosure being illustrated in a closed position and the latch being shown in its normal cover latching position;

FIGURE 2 is a top view of the switch enclosure shown in FIGURE 1 with the cover open to show the enclosed switchgear and an interlock mechanism constructed in accordance with this invention;

FIGURE 3 is a side view, partially cut away, of the switch enclosure shown in FIGURE 1 and revealing through the cut-away portion certain details of the interlock mechanism;

FIGURE 4 is an enlarged detail view taken on line 4—4 of FIGURE 1 showing certain portions of the latch mechanism;

FIGURE 5 is a perspective view of the interlock mechanism shown in FIGURE 2 showing its condition when the enclosure cover is open;

FIGURE 6 is a view similar to that of FIGURE 5 showing the condition of the interlock mechanism when the enclosure cover is in "closure-impeding" position, i.e., when it is almost closed but not yet latched;

FIGURE 7 is a view similar to that of FIGURE 5 showing the condition of the interlock mechanism when the cover is closed and latched and the switching device is on.

Referring now to the drawings, and in particular to FIGURES 1, 2 and 3 thereof, there may be seen a preferred embodiment of the invention in which an access cover 10 is supported by hinges 11 on a rectangular sheet metal enclosure 12. Mounted within the enclosure may be switchgear and electrical components of many types, of which the molded case circuit breaker 13 is an illustrative example. The circuit breaker is provided with a switch handle 14 shown in the "off" position in these illustrations.

The switch handle is arranged to be operated from outside the enclosure when the cover is closed. For this purpose, among others, a switch operating member 15 pivotally mounted at 16 is provided with a cutout portion 17, engaging the switch handle 14. As the switch operating member pivots to the right from the position shown in FIGURES 2 and 3 it carries with it switch handle 14 from the "off" position shown to the "on" position, not shown. To accomplish movement of the switch operating member 15 between "off" and "on" positions an operating handle 18 is mounted on the cover 10 of the enclosure. This operating handle as shown is of the so-called walking-beam type and is provided with holes 20, as best seen in FIGURE 1, for pull-cord or hook-stick operation if desired. The operating handle 18 extends through the cover to the inner side where it is connected to an operating lever 21 having a slot 22 cut therein. When the cover is closed the walls of the slot 22 engage pin 23 on the switch operating member 15 so that movements of the operating handle 18 are translated into movements of the switch operating member. Wings 24 on the operating lever 21 are arranged to interfere with pin 23 in the event that an attempt is made to close the cover when the operating handle is in a position which does not correspond to the condition of the enclosed switching device.

To indicate the condition of the enclosed switch an indicating slide 25 is arranged to be moved from side to side to display the appropriate "on" or "off" sign through window 25a. This is accomplished by mounting the indicator slide on the under side of the cover so that its elongated slots 26 slide on rivets 27, the indicator slide being caused to move between opposite positions by virtue of an integral L-shaped bracket 28 one leg of which extends into slot 22 of the operating lever and is trapped therein for movement with the operating handle.

An interlock mechanism constructed in accordance with the principles of this invention is shown generally at 30 in FIGURE 2. Its structure and operation, however, will be seen more clearly in connection with FIGURES 5, 6 and 7. In these illustrations the latch member 31 adjacent one wall of the enclosure is shown to be pivotally mounted at 32 on a fixed bracket 33 mounted securely to the inside of the enclosure 12. A latch spring 34 urges the latch member in a clockwise direction as seen in these three figures to effect a latching engagement between the overhanging lip 35 of the latch member and the latching edge 36 of a latch-operating member or slide 52 on the enclosure cover 10. The latching member 31 is L-shaped and carries upon its lower leg a post 37 which engages one arm of secondary lever 38 pivotally mounted at 40 upon the bracket 33. A struck out portion of bracket 33 defines projection 41 which, in extending within a slot 42 on secondary lever 38, limits the counter-clockwise movement of the secondary lever 38 due to the spring bias provided by spring 34.

On an adjacent wall of rectangular enclosure 12 an interlock lever 43 is mounted for pivotal movement about post 44, which is also affixed to bracket 33. One arm 45 of interlock lever 43 extends into engagement with the walls of aperture 46 at the opposite end of the secondary lever from that which is engaged by post 37. The other end of the interlock lever 43 is bifurcated to provide an upper projection 47 and a lower projection 48 separated by slot 50. The last-mentioned slot in the outer end of the interlock lever extends generally inward toward the pivotal axis of the interlock lever at 44. It can be seen, therefore, that movements of latch member 31 whether in a clockwise or counter-clockwise direction are translated into similar clockwise or counter-clockwise movements of interlock 43.

Consider the mode of operation of the interlock mechanism represented in FIGURE 5. In this illustration cover 10 is open and unlached. Consequently, latch member 31 under the urging of the bias provided by spring 34 moves to its extreme clockwise position, being limited against further movement only by the contact between the secondary lever 38 and projection 41 on the bracket 33. In this condition the interlock lever 43 is likewise caused to assume its most extreme clockwise position with important consequences. These consequences result from a interference which takes place between a projection or pin 51 on switch operating member 15 and projection 47 of the bifurcated interlock lever. Any attempt to move the switch operating member 15 from the "off" position represented iin FIGURE 5 to an "on" position in the direction of the arrow is prevented by the contact between pin 51 and projection 47.

Consider next the condition of the interlock mechanism presented in FIGURE 6, in which the cover door 10 is in "closure-impending" position, i.e., in which it is almost completely closed, but is not yet latched by virtue of the fact that edge 36 has not seated itself under the overhanging lip 35 of the latching member 31. In this condition the latching member 31 is forced to an extreme counter-clockwise position against the urging of the bias spring 34 by the edge 36 of the latch-operating member or slide 52. This position of the latch member is transmitted through the secondary lever to the interlock lever, causing the latter likewise to assume an extreme counter-clockwise orientation. The lower projection 48 of the bifurcated interlock lever in this case interfers with the pin or projection 51 mounted on the switch operating member. Any attempt to close the contacts of the enclosed switchgear is again prevented by the interference which results between projections 48 and 51.

When the cover is closed and securely latched an entirely different state of affairs exists. As seen in Figure 7, the spring biased latch member assumes an intermediate position between the extremes represented in FIGURES 5 and 6, being arrested in this intermediate position by the latching engagement between latch lip 35 of the latching member 31 and the latching edge 36 on the access cover 10. Similarly, the bifurcated end of the interlock lever 43 is caused to assume an intermediate position in which neither projection 47 nor projection 48 interferes with the movement of the projection 51 on the switch operating member. The switch operating member 15 may therefore pass unimpeded to the "on" position represented in FIGURE 7 with projection 51 sliding into and through slot 50.

Not only does the interlock mechnism as just described prevent the switch from being turned on when the cover is not securely closed and latched, but it also prevents the cover from being opened when the switch is on. As previously indicated, the FIGURE 7 illustration represents the condition of the interlock mechanism when the access cover is closed and the switch has been turned on. Except for deliberate efforts to defeat the safety features of the mechanism, any attempt to open the access cover when the switch is on will be prevented. To open the cover the latch member must be moved backward against the bias provided by its spring. However, as can be seen in FIGURE 7, the latch member 31 cannot be moved in a counter-clockwise direction to unlatch the door because the two projections defining the bifurcated end of the interlock lever 43 lock not only that lever, but also the secondary lever and the latch member in their positions, due to the projection 51 being trapped within the bifurcation.

In some cases it is desirable deliberately to defeat the interlock mechnism so that trained workmen can inspect the interior of the switch enclosure without interrupting power. For this purpose a defeat arrangement is provided, which is shown most clearly in FIGURE 4. There it can be seen that the latching edge 36 constitutes one end of a latch-operating member comprising slide 52 slideably mounted in bracket 53 affixed on the inner surface of the cover 10. A stiff spring 54 biases slide 52 with its latching edge 36 toward the latching position represented in FIGURE 4. In those cases where latch member 31 cannot be disengaged by virtue of the condition of the enclosed switchgear, a thin tool such as a screwdriver may be inserted in the slot in the access cover, through which the latching member 31 extends. Edge 36 may thereupon be urged backward against the bias of the spring to be disengaged from latching relationship with latch member 31 to open the enclosure cover.

It should also be noted that once the cover has been opened intentionally with the enclosed switching device in the "on" condition, either of two operations is still possible. On the one hand, the access cover can again be closed with no difficulty because of the fact that latching edge 36 engages the upper cam-shaped surface of latching member 31, slides backward against the urging of its spring 54, and relatches when the cover closes. Alternatively, the switch can be turned off manually while the cover is still opened, in which case projection 51 slides out of slot 50, permitting the interlock mechanism to relax to the position shown in FIGURE 5. This action automatically positions the interlock members in a safe condition to prevent inadvertent reenergization of the enclosed switch. It should also be observed that when the switch is off and the cover is open, as represented by the condition of the interlock mechanism in FIGURE 5, the enclosed switch contacts can be deliberately closed if the operator with one hand pulls latch member 31 back to its intermediate latch position, and with the other hand operates the switch. This type of operation simulates the operation of the interlock mechanism when the access cover is closed and latched.

While I have shown and described a preferred form of my invention by way of illustration, certain modifications will occur to those skilled in the art. The interlocking arrangement which is the subject of this invention may be incorporated in fixed switch enclosures or, for example, in busway plugs which are removable. When used with busway plugs the interlock mechanism may be combined with other interlock features designed to prevent removal of the switch and enclosure from a busway when the enclosed switch is on. It should therefore be clear that I intend by the concluding claims to cover all such modifications as fall within the true spirit and scope of my invention.

What I claim as new and desire to secure by Letters Patent of the United States is:

1. In combination:
   (a) an enclosure for an electric switching device;
   (b) a cover for said enclosure;
   (c) means pivotally mounting said cover on said enclosure for movement to open, closed, and closure-impending position respectively;
   (d) a switch-operating member;
   (e) means mounting said switch operating member in said enclosure for movement between "on" and "off" positions corresponding to "on" and "off" conditions of said switching device;
   (f) manually operable operating means accessible externally of said enclosure when said cover is in said closed position and connected to said switch-operating member for operating said switching device when said cover is in said closed position;
   (g) a latch member;
   (h) means mounting said latch member on said enclosure for movement between first and second extreme positions and an intermediate position respectively;
   (i) biasing means biasing said latch member toward said second extreme position at all times;
   (j) interlock means comprising first and second spaced interfering portions and an intermediate clearance slot;
   (k) means supporting said interlock means in said enclosure for movement between first and second blocking positions in each of which positions a corresponding one of said interfering portions is in the path of movement of said switch operating member and prevents movement thereof from said "off" to said "on" position, and for movement to an intermediate position in which said clearance slot is in the path of movement of said switch operating member so that said interlock means does not prevent movement of said switch operating member from said "off" to said "on" position;
   (l) means connecting said latch member to said interlock means for movement of said interlock means to said first and second blocking positions and to said intermediate non-blocking position upon movement of said latch member to said first and second extreme positions and said intermediate position respectively;
   (m) a latch-operating member carried by said cover of said enclosure;
   (n) said latch-operating member engaging said latch member when said cover is in said closure-impending position and holding said latch in said first extreme postion corresponding to said first blocking position of said interlock means;
   (o) said latch operating member being disengaged from said latch member when said cover is in said open position and allowing said latch member biasing means to move said latch to said second extreme position corresponding to said second blocking position of said interlocking means;
   (p) said latch operating member engaging said latch member when said cover is in said closed position and holding said latch in said intermediate poistion corresponding to said intermediate position of said interlock means.

2. combination as set forth in claim 1, wherein:
   (a) said latch member comprises a first lever and means pivotally mounting said lever in said enclosure;
   (b) said interlock means comprises a second lever and means pivotally mounting said lever in said enclosure separately from said latch member;
   (c) said means connecting said latch member to said interlock means comprises a third lever and means pivotally mounting said lever in said enclosure separately from said latch member and said interlock means.

3. A combination as set forth in claim 1, said combination also comprising means slidably mounting said latch operating member on said cover for movement between normal and retracted positions, means biasing said latch operating means toward said normal position, said cover having an access opening through which said latch operating member is accessible for movement to said retracted position to disengage said latch operating member from said latch member when said cover is closed.

References Cited by the Examiner
UNITED STATES PATENTS 2,163,230  6/39  Rowe _____ 200—50
3,122,615  2/64  Chace _____ 200—50

BERNARD A. GILHEANY, *Primary Examiner.*